US006757298B1

(12) United States Patent
Burns et al.

(10) Patent No.: US 6,757,298 B1
(45) Date of Patent: Jun. 29, 2004

(54) VLAN TRUNKING OVER ATM PVCS (VTAP)

(75) Inventors: Barry S. Burns, Apex, NC (US); Christopher J. Lefelhocz, Raleigh, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 09/685,218

(22) Filed: Oct. 10, 2000

(51) Int. Cl.[7] .............................. H04J 3/24; H04L 12/28
(52) U.S. Cl. ................................. 370/473; 370/395.53
(58) Field of Search .............................. 370/473, 474, 370/401, 395.1, 397, 395.51, 395.53

(56) References Cited

U.S. PATENT DOCUMENTS

| | | | |
|---|---|---|---|
| 5,742,604 A | | 4/1998 | Edsall et al. |
| 5,878,043 A | * | 3/1999 | Casey .......................... 370/397 |
| 5,892,912 A | * | 4/1999 | Suzuki et al. ........... 370/395.53 |
| 6,034,958 A | * | 3/2000 | Wicklund ............... 370/395.32 |
| 6,137,798 A | * | 10/2000 | Nishihara et al. ........... 370/392 |
| 6,208,649 B1 | | 3/2001 | Kloth |

OTHER PUBLICATIONS

"LAN Emulation Over ATM," Version 1.0, af–lane–0021–0000, ATM Forum Technical Committee, 1995, pp. 1–141.

"LAN Emulation Over ATM," Version 1.0 Addendum, af–lane–0050.0000, ATM Forum Technical Committee, 1995, 99. 1–8.

Heinanen, J., "Multiprotocol Encapsulation Over ATM Adaptation Layer 5," RFC 1483, Internet Engineering Task Force, Networking Working Group, pp. 1–16.

* cited by examiner

*Primary Examiner*—Chau Nguyen
*Assistant Examiner*—Andrew Wahba
(74) *Attorney, Agent, or Firm*—Cesari and McKenna, LLP

(57) ABSTRACT

Virtual Local Area Network (VLAN) trunking over Asynchronous Transfer Mode (ATM) Permanent Virtual Circuits (PVC), defined as VTAP, allows for aggregation of multiple VLAN traffic into a single data pipe in a Wide Area Network (WAN) environment. The largest benefit for the user is that a single PVC can be utilized to aggregate all of their VLAN traffic between two sites. Packets to be transmitted between two switches are first encapsulated with a VTAP header that contains pertinent information as to allow the receiving switch to process and forward the packet at the switch. Certain information contained in the VTAP is also used to determine the virtual path identifier/virtual channel identifier (VPI/VCI) of the destination switch wherein the packet is segmented into ATM cells having VPI/VCI prefixed to it for forwarding via the ATM network.

20 Claims, 15 Drawing Sheets

VLAN TRUNKING OVER ATM PVCS (VTAP)

BACKGROUND OF THE INVENTION

1. Field of the Invention

The present invention relates to Virtual Local Area Network (VLAN) trunking over Asynchronous Transfer Mode (ATM) Permanent Virtual Circuits (PVCs), and in particular to aggregating multiple VLANs onto a single PVC between two sites.

2. Background Information

Computers have made a substantial impact in the way corporations operate their business. The computer paradigm initially started out as a central computer (known as "main frame") housed in one room that served all the needs of an organization's computational requirements. Main frames are generally expensive to procure and require intensive maintenance as well as a dedicated group of skilled programmers to service them. However, with the advancement of computer technology and fabrication techniques, powerful, yet small computers (known as personal computers (PCs)) capable of servicing individuals have become readily available. Furthermore, sophisticated off-the-shelf software have allowed individuals with no previous computing background to be highly productive using PCs. From the organization's point of view, this decentralized computer paradigm is more desirable in that a computer, which maybe "down" in one department, does not affect other computers in other departments. Furthermore, individual computers may be replaced on a as needed basis without unduly burdening the organization. However, individual computers operating autonomously are disadvantageous over the main frame in that they do not share resources among themselves.

The use of local area networks (LANs) allows for various PCs within a department to be connected together so that resources may be shared. Typically, one or more PCs are configured to act as servers to maintain files and to administer the LAN. Typically, the LAN would have a communication cable that connects the computers together for the interchange of information. To ensure that information is transmitted without corruption, popular arbitration schemes such as the Institute of Electrical and Electronics engineers (IEEE) 802.3 standard/Ethernet or IEEE 802.5 standard/token ring are widely used.

From an organizational point of view, it is desired that the individual LANs be connected together such that interdepartmental communication may be facilitated. For instance, the marketing department may want to access files in the manufacturing department. The manufacturing department, on the other hand, may want to access files in the procurement department. Therefore, to facilitate this, each of the individual LANs within the department may be connected by another LAN or LAN switches if each department is within the same building.

Where the individual departments are in different geographical areas, a wide area network (WAN) may be used to interconnect the LANs. Between campuses, one method would be to connect the LANs of each campus using a LAN switch. The campuses can then be connected via a Broadband Integrated Services Digital Network (B-ISDN) based on an Asynchronous Transfer Mode (ATM) network. This configuration is shown in FIG. 1. Although an ATM network is not a LAN per se, it can emulate the LAN to make it appear as if the individual switches are connected through a LAN system.

The ATM network switches small fixed units of data called "cells". Switch latency is minimized because the small cell size equates to a small store-and-forward delay. It offers permanent virtual circuits (PVCs) that allows for static connections and switched virtual circuits (SVC) that are automatically set up and torn down on need basis. In accordance with the ATM FORUM that defines the ATM specification, the cell size is 53-bytes having the following components among others:

Virtual path identifier (VPI): Identifies the path to be taken by the ATM cell. In an idle or null cell, the VPI field is set to all zeros. (A cell containing no information in the payload field is either "idle" or "null"). A virtual path connection (VPC) is a group of virtual connections between two points in the network. Each virtual connection may involve several ATM links. VPIs bundle ATM traffic being sent to the same destination.

Virtual channel identifier (VCI): Identifies the circuit or connection number on that path. In an idle or null cell (one containing no payload information), the VCI field is set to all zeros. Other non-zero values in this field are reserved for special purposes. For example, the values VPI=0 and VCI=5 are used exclusively for ATM signaling purposes when requesting an ATM connection. A virtual channel connection (VCC) is a connection between two communicating ATM entities; the connection may comprise of many ATM links.

Payload type identifier (PTI): Indicates the type of data being carried in the payload. The first bit is a 0 if the payload contains user information and is a 1 if it carries connection management information. The second bit indicates if the cell experienced congestion over a path. If the payload is user information, the third bit indicates if the cell experienced congestion over the path. If the payload is user information, the third bit indicates if the information is from customer premises equipment (CPE). The payload is a maximum of 48 bytes.

The PVC is statically configured and mapped to a network in a subinterface point-to-point configuration. The path of the PVC is identified at each switch by an incoming VPI/VCI and an outgoing VPI/VCI. The logical data link layer may use the Subnetwork Access Protocol (SNAP) encapsulation as defined in the Request For Comments (RFC) 1483 published by the Internet Engineering Task Force (IETF). Alternatively, the logical data link layer can use LAN emulation (LANE) as specified in ATM FORUM 94-0035. LANE makes the ATM network transparent to LAN traffic by mapping connectionless LAN traffic over the connection-oriented ATM network. It uses point-to-multipoint connections to service the connectionless broadcast service that is required by LAN protocols.

The ATM Adaptation Layer (AAL) is used to receive the data from the various sources or applications and convert it to 48-byte segments that will fit into the payload of an ATM cell. There are several types of adaptation layers currently specified of which the AAL5 adaption layer is worth mentioning:

The AAL5 Common Part Convergence Sublayer (CPCS) Protocol Data Units (PDU) format is shown below:

| CPCS-PDU | Payload | CPCS-PDL |
|---|---|---|
| Up to 2 ^ 16 | −1 octet | Payload |
| PAD (0 to | 47 octets) | |
| CPCS-UU | (1 octet) | CPCS-PDL |
| CPI (1 | Octet) | Trailer |

| | |
|---|---|
| Length (2 octets) | |
| CRC (4 | Octets) |

The payload field contains user information up to $2^{16}-1$ octets in length. The PAD field is used to pad the CPCS-PDU to be exactly 48 octets in length. The CPCS-UU (User-to-User indication) field is unused. The CPI (Common Part Indicator) field aligns the CPCS-PDU Trailer to 64 bits. Must be set to 000.

The Length field indicates the length, in octets, of the Payload field. The maximum value for this field is 65535 octets. A length of zero is used to indicate an abort. The CRC field protects the entire CPCS-PDU except the CRC field itself.

A Virtual LAN (VLAN) is a logical network that is defined according to the functions or applications of the users without regard to their physical locations (a physical LAN on the other hand is dependent on the user's physical proximity). As shown in FIG. 2, the end stations may be located in different campuses, however, the VLAN is able to group them together to operate with the same attributes of a LAN (i.e., as if they were connected together by the same physical LAN). Generally, VLANs are based on where the physical LANs enter the switch. For instance, in FIG. 3, a LAN switch may be configured such that ports 301–303 and 306 belong to VLAN 1, ports 304 and ports 307–310 belong to VLAN2, and ports 305, 311, 313 belong to VLAN3. Ports in a VLAN share broadcast traffic, however, ports that do not belong to that VLAN do not share the broadcast traffic.

Inter-Switch Link (ISL) protocol is a Cisco protocol that interconnects multiple switches and maintains VLAN information as traffic goes between switches and routers. A trunk is a physical link between two network devices, and in this instance carries multiple VLANs between two switches or between a switch and a router, thereby allowing VLANs to be extended across switches. Trunks use high-speed interfaces such as Fast Ethernet, Fiber Data Distributed Interface (FDDI), or ATM. With ISL, a frame is encapsulated with a header that transports VLAN IDs if the frame is destined for a non-local network. Further information on ISL is disclosed in U.S. Pat. No. 5,742,604, issued on Apr. 21, 1998 to Edsall et al., and titled "Interswitch Link Mechanism For Connecting High-Performance Network Switches", which is incorporated herein by reference. FIG. 4 illustrates VLAN packets traversing a trunk. Each VLAN packet carries the VLAN ID within the packet header. ISL forwards data across the high-speed link without breaking the frames into cells, that is, the frame is sent intact across the ISL connection. This is due to the fact that ISL was originally developed for Ethernet switches and thus, by its nature is unsuitable for transmission over an ATM network.

LANE or multiprotocol encapsulation defined under RFC 1483 are used to carry LAN data over the ATM. In a public network, this becomes very expensive because the numbers of PVCs/SVCs required to implement the above mentioned protocols increase with the number of LANs to be transported. It is desirable to reduce this cost.

SUMMARY OF THE INVENTION

The present invention pertains to Virtual Local Area Network (VLAN) trunking over Asynchronous Transfer Mode (ATM) Permanent Virtual Circuits (PVCs), defined as VTAP. In particular, the invention allows aggregation of multiple VLAN traffic into a single data pipe in a Wide Area Network (WAN) environment. An advantage of the invention is that a single PVC can be utilized to aggregate all user LAN traffic between two sites. Within a switch, a processing unit constructs inbound and outbound tables that are used by an ATM interface to provide translation and forwarding information concerning ATM Adaptation Layer (AAL) frames attached with VTAP headers.

In accordance with an embodiment of the invention, there is an interaction between the AAL layer, the VTAP layer, the Inter-Switch Link (ISL) layer and the inbound or outbound tables. In the case where a frame is received by the ATM interface to be transmitted over the ATM network, the frame first passes through the ISL layer that assigns the frame a VLAN ID corresponding to its destination in accordance with the ISL protocol. The VLAN ID distinguishes the frame from other frames that are forwarded to different VLANs. Once the VLAN ID is assigned to the frame, it is passed to the VTAP layer where a VTAP header is generated that includes the VLAN ID. The VLAN It is also used to lookup the outbound table to determine the VPI/VCI address of the switch to which the frame should be forwarded. The retrieved VPI/VCI and the frame are then passed to the AAL layer which segments the frame into ATM cells, wherein each individual cell has a header with a prefixed VPI/VCI address. The cells are then forwarded to the destination switch via the ATM network.

In the case where the ATM cells are received at the ATM interface, the cells are passed to the AAL layer which re-assembles the cells into the VTAP encapsulated frame. The frame is then passed to the VTAP layer where the VTAP header is stripped and parsed for the DEST VLAN field. This field contains the VLAN ID of the packet. The VLAN ID is then used to lookup the inbound table to determine the logical ISL address to which the frame should be forwarded. This ISL address and the frame are forwarded to the ISL layer which processes the frame in accordance with the ISL protocol. If the ISL address is located on the same switch, the frame is forwarded to one of the I/O interfaces that forwards the frame to its destination VLAN.

In the event, the logical ISL address indicates that the frame should be forwarded to another switch, the frame is passed from the ISL layer to the VTAP layer in preparation for transmission via the ATM network as described above.

BRIEF DESCRIPTION OF THE DRAWINGS

The invention description below refers to the accompanying drawings, of which.

DETAILED DESCRIPTION OF AN ILLUSTRATIVE EMBODIMENT

VTAP Network Topologies

VTAP network topologies may be divided into four areas: Fully Meshed, Partially Meshed, Sparse Backbone, and Sparse Distributed.

Figure 1:
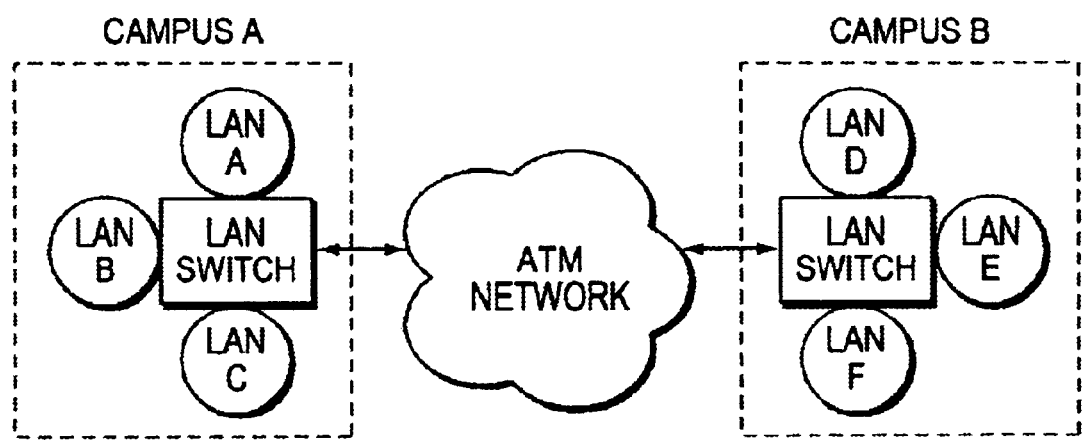
FIG. 1 illustrates two campuses connected together via an Asychronous Transfer Mode (ATM) network.
Figure 2:
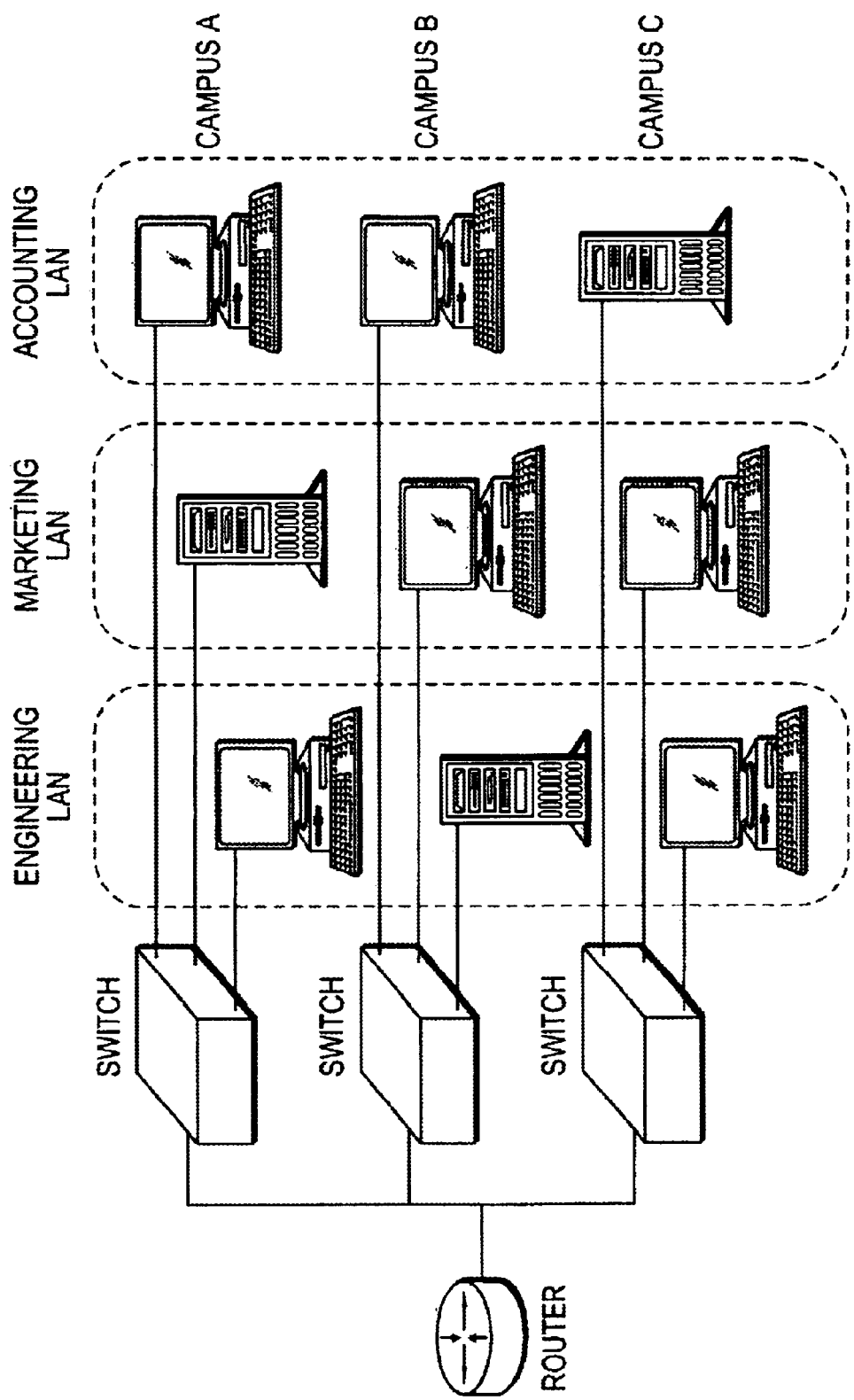
FIG. 2 illustrates an exemplary Virtual Local Area Network (VLAN)
Figure 3:
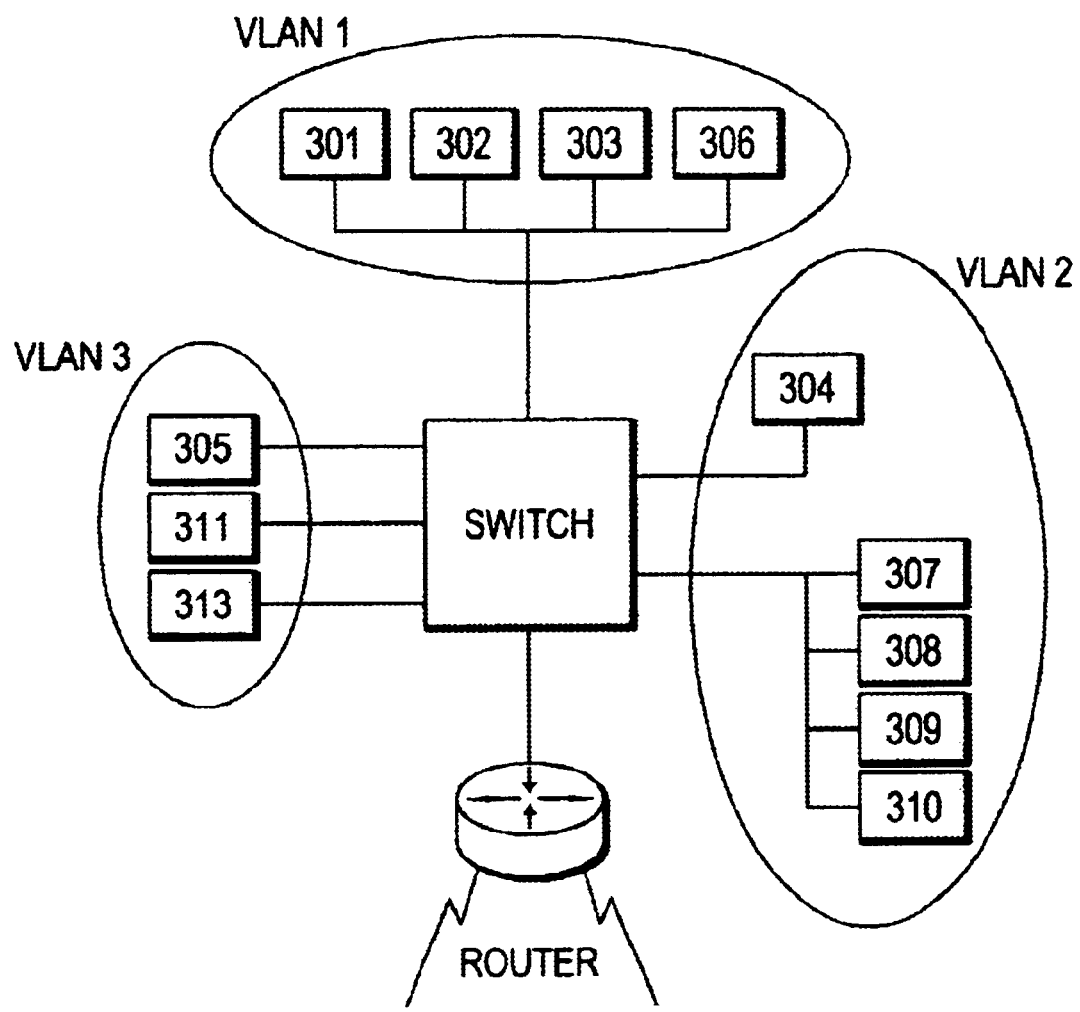
FIG. 3 illustrates an exemplary LAN switch.
Figure 4:
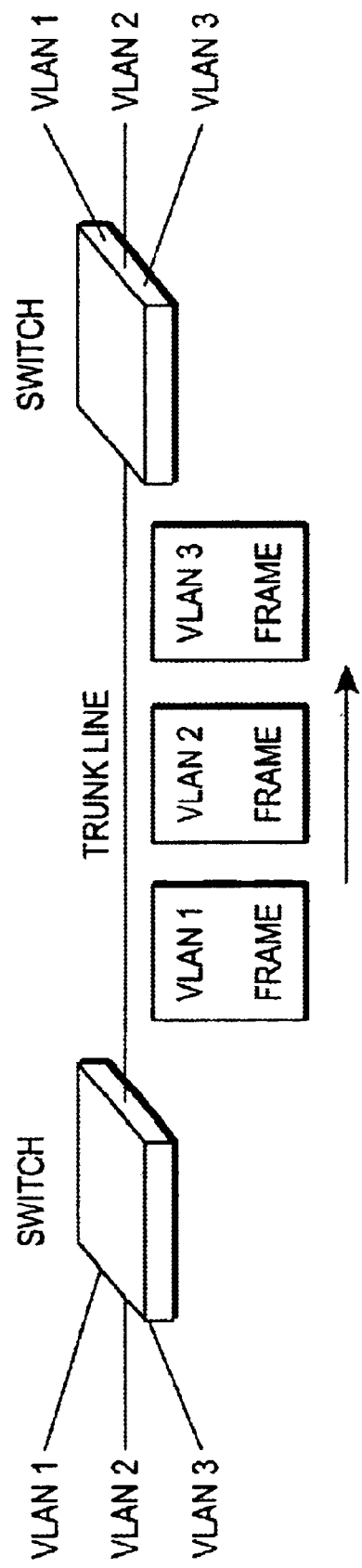
FIG. 4 illustrates VLAN packets traversing between two switches that utilize Inter-Switch Link (ISL) protocol.
Figure 5:
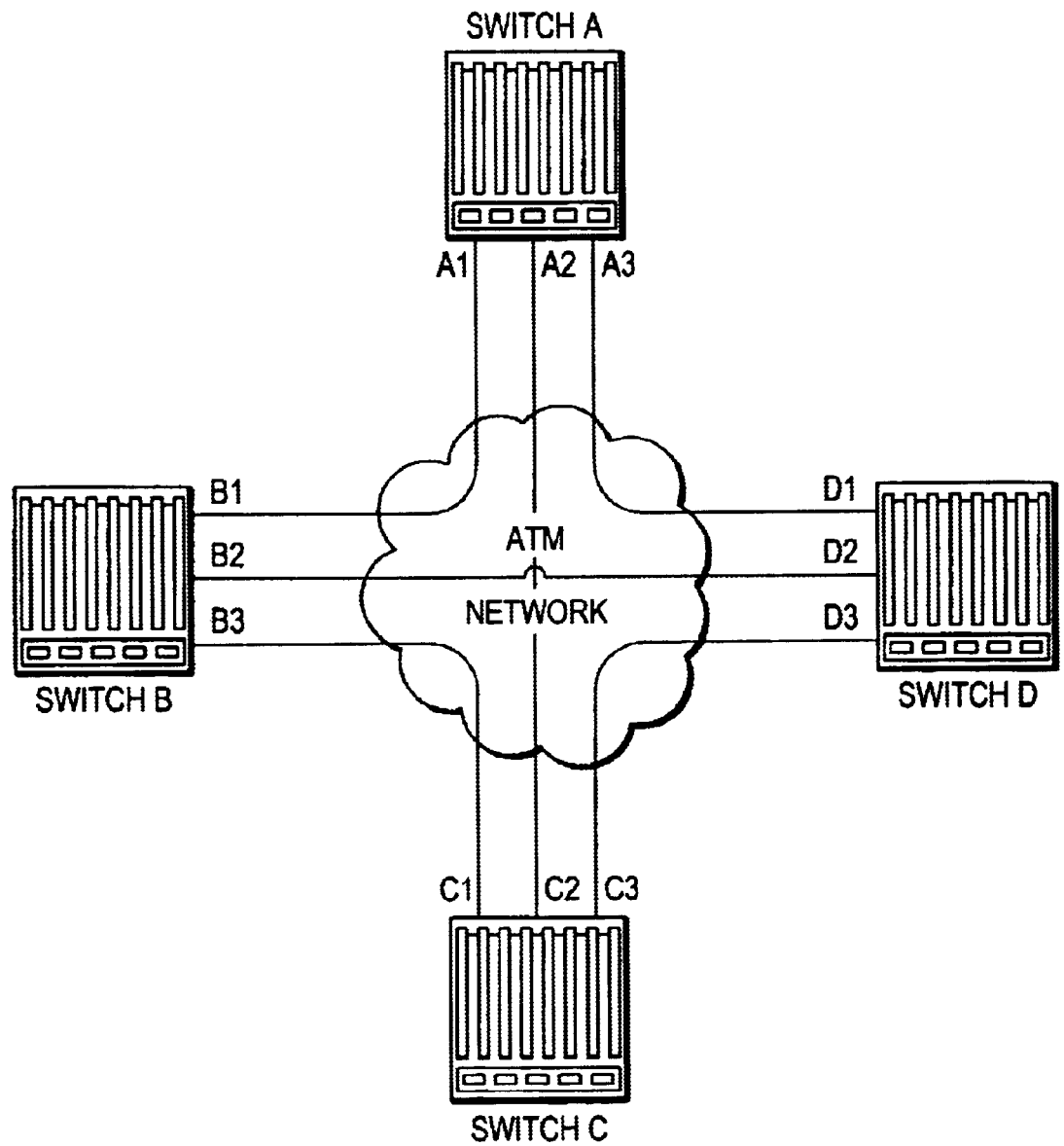
FIG. 5 illustrates an exemplary Fully Meshed VLAN Trunking over ATM Permanent Virtual Circuits (VTAP) Network.

A Fully Meshed VTAP network requires that each network node be connected via a PVC to each of the other network nodes. The number of PVCs required to implement a Fully Meshed network is (n*(n−1))/2, where n is the number of switches connected to the network. FIG. 5 shows a four node Fully Meshed VTAP network. Note that the number of PVCs required to implement this network is six. A PVC is indicated in the figure by <letter><#>-<letter><#>, where <letter> is the switch it is connected to and <#> is the local PVC number. Thus, the. PVC from Switch A to Switch B is designated as A1–B1. Since all nodes in a fully meshed network are connected to each other, there is no reason to switch Protocol Data Units (PDUs) between PVCs, thus, making the implementation much simpler.

Figure 6:
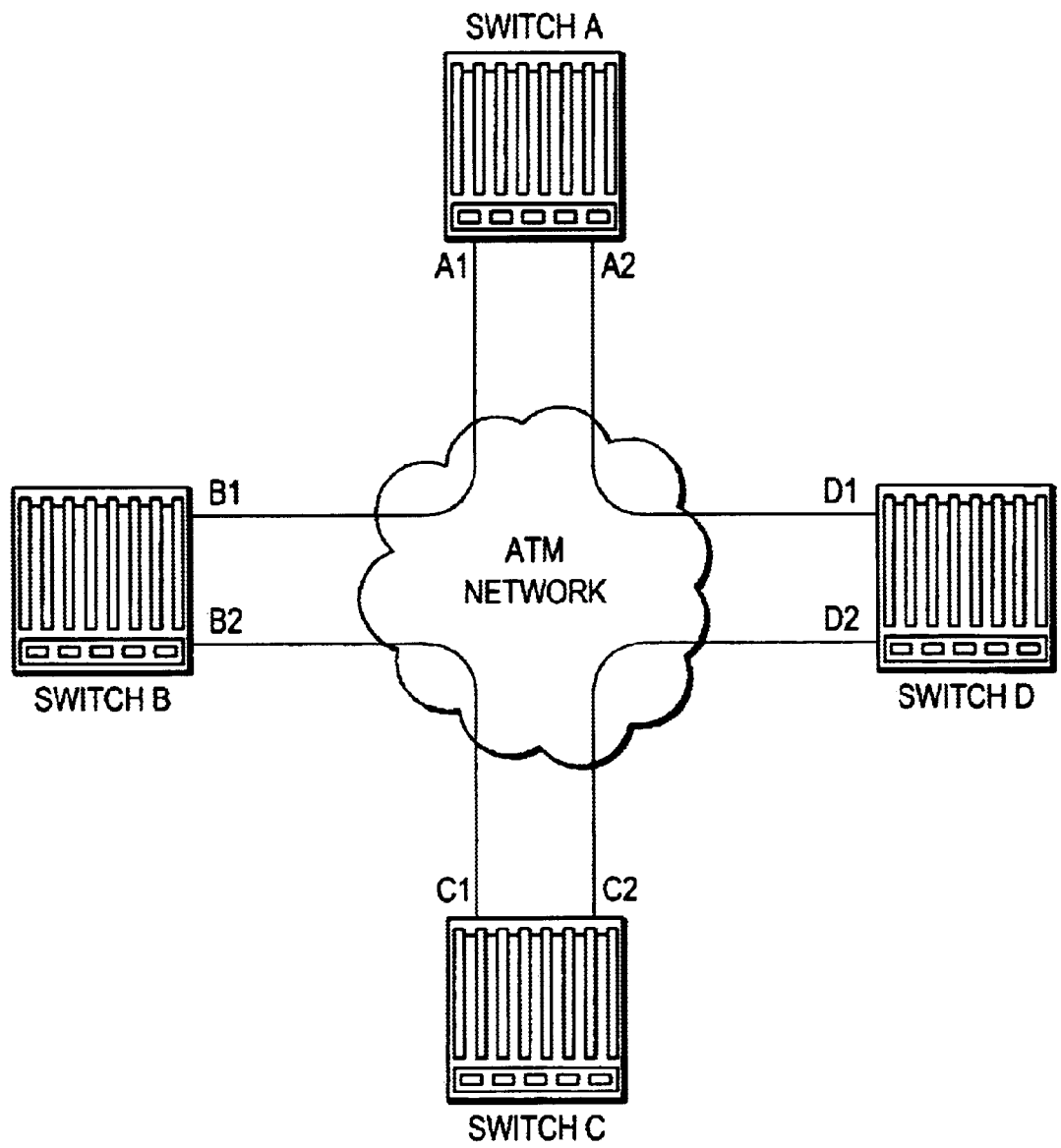
FIG. 6 illustrates an exemplary Partially Meshed VTAP network.

A Partially Meshed VTAP network implies that each switch be capable of switching PDUs between PVCs. Inter-PVC switching increases the complexity of the switch implementation. FIG. 6 shows a four node Partially Meshed VTAP network. Note that in this topology the number of PVCs is reduced between (n) and (n*(n−1))/2 PVCs.

Figure 7:
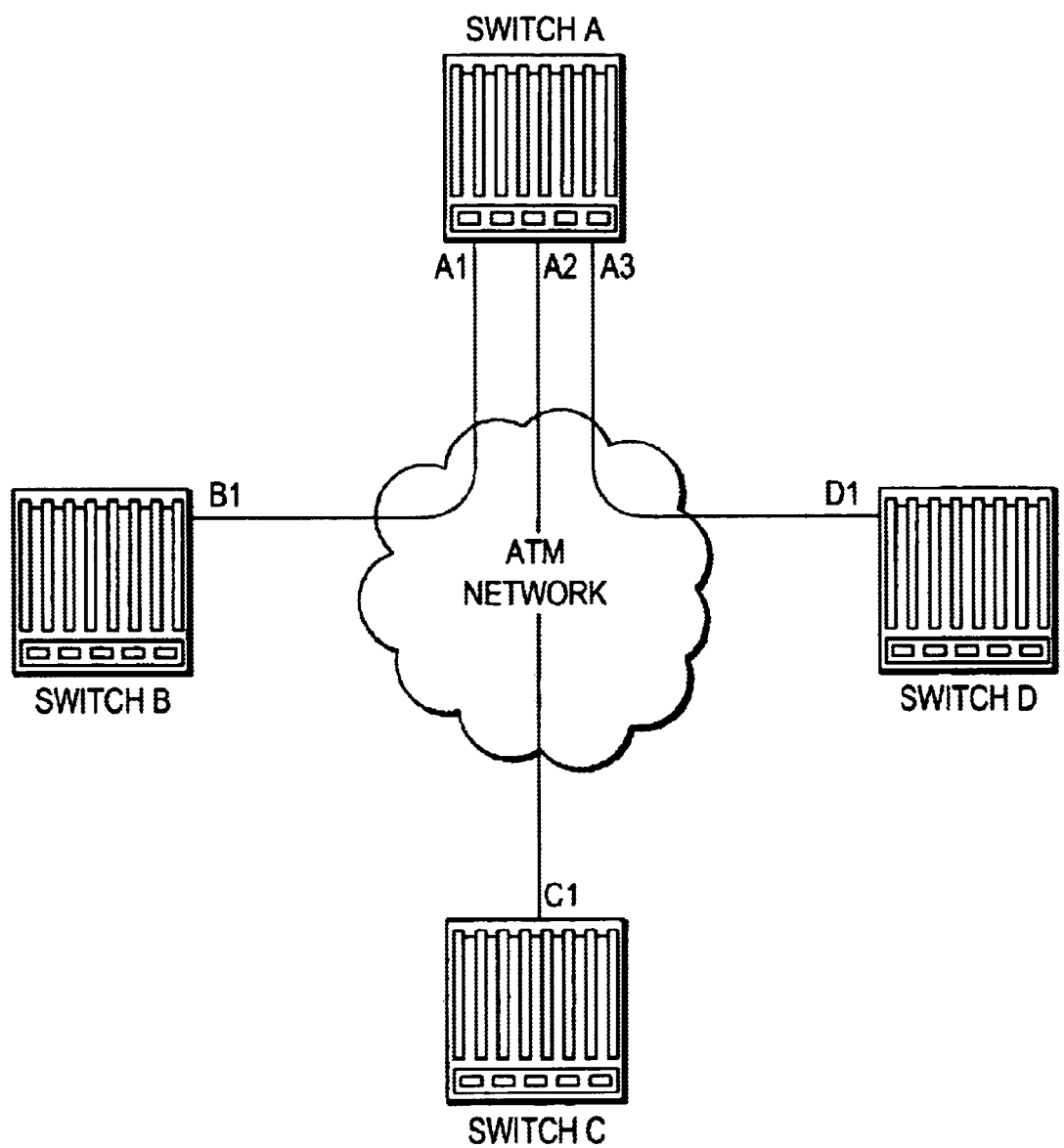
FIG. 7 illustrates an exemplary Sparse Backbone VTAP network.

A Sparse Backbone VTAP network utilizes a backbone switch (higher switching bandwidth and greater CPU performance) to perform inter-PVC switching. A Sparse Distributed VTAP network is very similar to a Partially Meshed network. FIG. 7 shows a four node, Sparse Backbone VTAP network. One of the advantages of this type of network is that it reduces the number of PVCs required to (n−1). Further, the client nodes do not have to perform inter-PVC switching.

Figure 8:
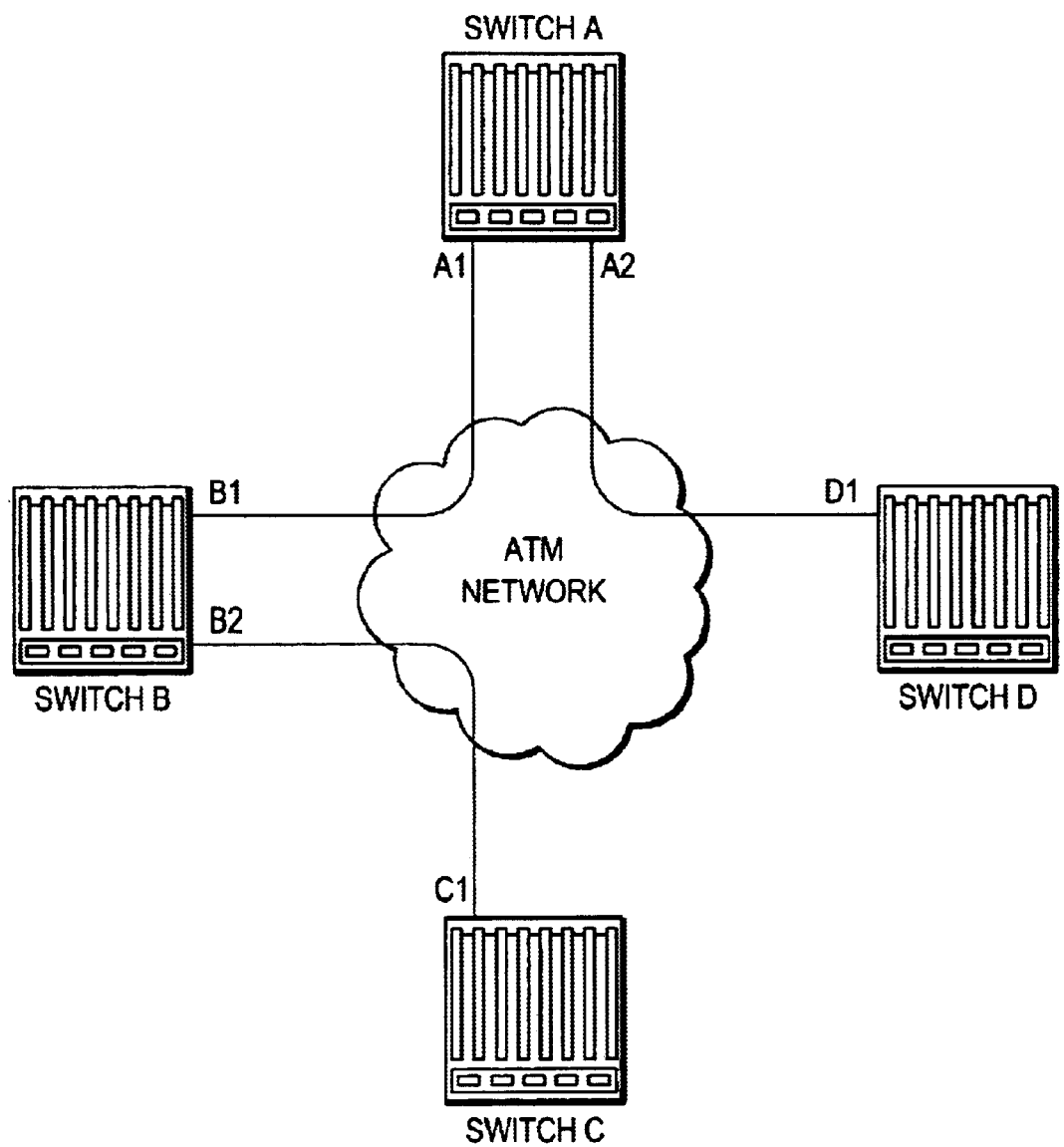
FIG. 8 illustrates an exemplary Sparse Distributed VTAP Network.

A Sparse Distributed VTAP Network is similar to the Partially Meshed network. This configuration is shown in FIG. 8. One of its advantages is that it reduces the number of PVCs required to (n−1). The disadvantage of this network is that all of the switch nodes must be capable of inter-PVC switching.

Functional Description

The VTAP protocol may have two major functional areas: encapsulation method and VTAP management protocol.

Encapsulation Methodology

The VTAP protocol will encapsulate all data traffic and management traffic within the ATM Payload field of the Common Part Convergence Sublayer (CPCS) PDU of the ATM Adaptation Layer type 5 (AAL5), for instance. Both data and management packets will have a VTAP header prefixed to them.

VTAP Header

A VTAP frame falls into one of two major categories: VTAP management frame or an encapsulated data frame. A single octet header is used to distinguish between the VTAP management frames and data frames. The common part of the VTAP header is shown below (the number of bits required for each field is shown at the top). The Identifier field definition is also shown below.

| Common VTAP Header Format | |
|---|---|
| 8<br>IDENTIFIER | VTAP Management Frame or VTAP Encapsulation Header plus Encapsulated Frame |

| IDENTIFIER field Definition | |
|---|---|
| IDENTIFIER | Description |
| 0x00 | Encapsulated Data Frame |
| 0xFF | VTAP Management Frame |

VTAP Data Encapsulation

The VTAP protocol utilizes an encapsulation header to provide information to the receiving device on how to process and forward the packet. Two encapsulation headers may be utilized: Common VTAP Encapsulation header and Token Ring Encapsulation Header.

Common VTAP Encapsulation

The Common VTAP Encapsulation header, shown below, is used for Ethernet, ATM and FDDI packets. The Encapsulated Frame begins on a 4-byte boundary. Note that the number at the top of each field represents the size of the field in bits.

| Common VTAP Payload Format | | | | |
|---|---|---|---|---|
| 8<br>IDENTIFIER | 4<br>TYPE | 4<br>USER | 15<br>DEST VLAN | 1<br>CPU |
| Encapsulated Frame<br>(from 1 to 2 ^ 16 − 5 octets) | | | | |

Field Definitions:

TYPE—The TYPE field indicates the type of frame that is encapsulated. The following TYPES are defined:

| TYPE field Definition | |
|---|---|
| TYPE | Description |
| 0000 | Ethernet |
| 0001 | Token Ring |
| 0010 | FDDI |
| 0011 | ATM |

USER—The USER bits are used to extend the meaning of the TYPE field. The default USER field is 0000. For Ethernet Frames, the USER field is defined below:

| USER field Definition | |
|---|---|
| USER | Description |
| XX00 | Normal Priority |
| XX01 | Priority 1 |

-continued

USER field Definition

| USER | Description |
|---|---|
| XX10 | Priority 2 |
| XX11 | Highest Priority |

DEST VLAN—This is the Virtual LAN ID of the packet. It is a 15-bit value to distinguish between frames on different VLANs. This field is often referred to as the "color" of the packet.

Token Ring utilizes two levels of VLANs: TrCRF (logical ring) and TrBRF ( entire Token Ring Bridged network). A TrBRF is comprised of one or more TrCRFs since a packet may travel from one TrCRF to another TrCRF within a single TrBRF. The Destination VLAN (this field) is used to forward the packet. For Broadcast packets, this field can be either a TrCRF or TrBRF value depending on the scope of the packet.

CPU—The CPU bit is set for all bridge protocol data units (BPDUs) that are encapsulated by the VTAP protocol. The Spanning Tree algorithm uses BPDUs to determine network topology.

Token Ring VTAP Encapsulation

The Token Ring Encapsulation Header, shown below, is used for Token Ring and is a superset of the Common VTAP Encapsulation header. The AC octet of the Token Ring frame is overlaid with the RES and FCS fields and thus, the beginning of the frame falls on a even boundary (10-byte).

Token Ring VTAP Payload Format

| 8 | 4 | 4 | 15 | 1 | 15 | 1 |
|---|---|---|---|---|---|---|
| IDENTIFIER | TYPE | USER | DEST VLAN | CPU | SRC VLAN | EXP |
| 16 | 16 | 7 | 1 | 8 | Encapsulated Token Ring Frame (from 1 to $2^{16}$ − 13 octets) | |
| DEST RD | SRC RD | RES | FCS | FC | | |

Token Ring Field Definitions:

TYPE—Same as common header.

USER—The USER bits are set 0000 for Token Ring.

DEST VLAN—Token Ring utilizes two levels of VLANs: TrCRF (logical ring) and TrBRF (entire Token Ring Bridged network). A TrBRF is comprised of one or more TrCRFs since a packet may travel from one TrCRF to another TrCRF within a single TrBRF. The Destination VLAN (this field) is used to forward the packet. For Broadcast packets, this field can be either a TrCRF or TrBRF value depending on the scope of the packet.

CPU—Same as common header.

SRC VLAN—The SRC VLAN field is the source virtual LAN ID of the packet. It is a 15-bit value that is used to distinguish frames on different VLANs. The value represents the "color" of the source port. This value is primarily used for learning.

EXP—THE EXP bit is set if the packet is a Token Ring EXP—THE EXP bit is set if the packet is a Token Ring Explorer frame. This bit is a replication of the most significant bit of the Routing Control field of the RIF. It indicates either an All-Routes Explorer (ARE) or a Spanning Tree Explorer (STE) frame.

DEST RD—The Destination Route Descriptor is 16 bits: 12 for the ring number and 4 for the bridge number. This Route Descriptor (RD) is the RD immediately following the RIF match (Ring In—Bridge Number—Ring Out match) and is used for the forwarding decision. If the value is zero, then there is not a RD that follows the RIF match or there is not a RIF, in which case the MAC Destination Address is used for forwarding.

SRC RD—The Source Route Descriptor is the RD immediately preceding the RIF match and is used for source learning. If the value is zero, then there is not a RD that precedes the RIF match or there is not a RIF, in which case the MAC Destination Address is used for learning.

RES—Reserved field.

FCS—The FCS bit is set when the encapsulated Token Ring packet does not have a FCS field. This can occur when an in-bound port strips the FCS because the RIF have been modified and thus invalidating the FCS. TR LANE also strips the FCS on all frames. The outbound Token Ring port is required to append a valid FCS to the packet.

Token Ring Explorers

A special case exists for expanding Token Ring Explorer frames. For the case when the RIF length equals 2 octets (Explorer has not yet traversed a bridge, so zero hop length), the transmitting VTAP module must expand the RIF to include the source ring number and thus changing the RIF length to 4 octets. Note that this is an invalid RIF, but it is done so that the receiving VTAP module does not need to do a SRC VLAN conversion to ring number. The RIF will be completed with the Bridge number and the outbound Ring number by the receiving VTAP device.

Operation

Figure 9:
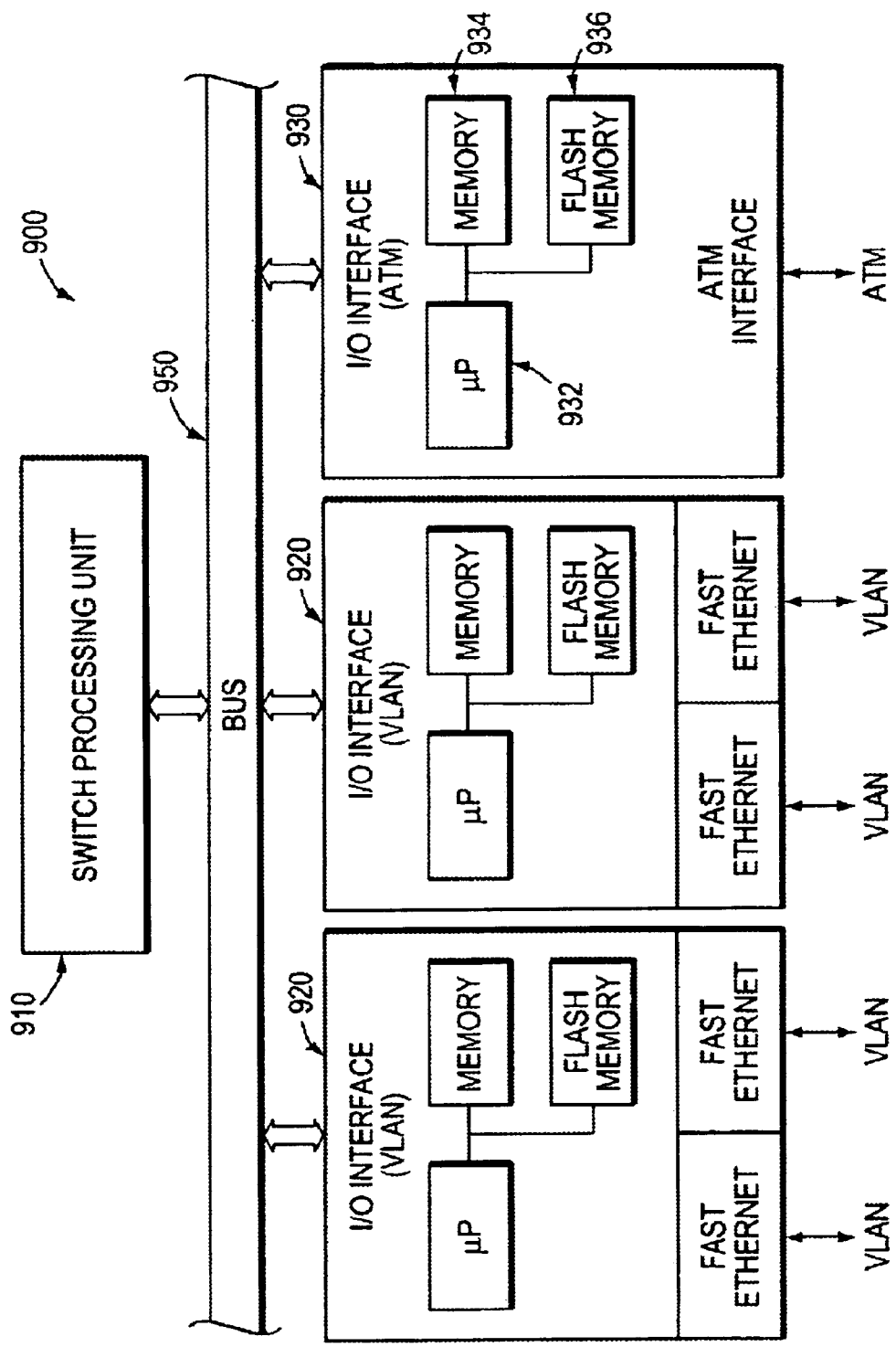
FIG. 9 is a schematic diagram of an exemplary switch in which VTAP may be implemented.

FIG. 9 shows an illustrative LAN switch 900 that is used to aid in the understanding of the invention. The LAN switch 900 comprises a switch processing unit 910 that is coupled to a plurality of Input/Output (I/O) Interfaces 920 and an ATM interface 930 via a communication bus 950. The interfaces 920, 930 aid in the switching of the LAN traffic thereby offloading significant switching work from the switch processing unit 910. In this configuration, the switch processing unit 910 is able to focus on networking functions such as gathering network topology information. This information may be used to construct switching tables for distribution to the I/O interfaces 920. In accordance with the invention, the switch processing unit 910 further constructs inbound and outbound tables (see FIG. 10) that are used by the ATM interface 930 to provide translation and forwarding information concerning AAL frames with VTAP headers. Further details concerning the interaction of the tables and the AAL frames with VTAP headers will be described with respect to FIG. 10.

Turning to the ATM interface, it includes a processor 932 that is coupled to a volatile memory 934 and an electrically erasable non-volatile memory such as a Flash memory 936. The inbound and outbound tables that is received from the switch processing unit 910 may be stored in the Flash memory 936 although they can easily be stored in the volatile memory 934. Processor executable instructions are stored in the volatile memory 934 and when executed by the processor 932, causes it to attach or strip a VTAP header to a frame depending on whether the frame is outbound or inbound respectively. In the event that the VTAP header is stripped, the instructions further cause the processor 932 to parse the header for pertinent information such as VLAN ID, which it uses to forward the frame to the appropriate VLAN via the VLAN interface 920. In the event that the frame needs to be forwarded to another switch, the instructions cause the processor 932 to "lookup" the outbound table to determine the destination port to which the frame should be forwarded. From this information, a VTAP header is created which is attached to the frame and the frame is forwarded to the switch via the ATM interface 930.

For a frame that requires segmentation into ATM cells or ATM cells that require reassembly into a frame, the instructions further provide this feature to the processor 932 and is commonly known as "Segmentation and Reassembly unit (SAR). For instance, the I/O interface 920 may receive a frame from a VLAN, which according to the switch table indicates that the frame should be sent to a port on a different switch. The I/O interface then forwards the frame to the ATM interface 930 which it stores in the memory 934.

Conversely, the ATM interface 930 may receive ATM cells from an ATM port which it re-assembles into a frame. From the inbound table, the ATM interface 930 determines that the frame should be forwarded to a VLAN located at an I/O interface 920. The ATM interface 930 then forwards the frame to the indicated I/O interface which it stores in the memory.

Figure 10:
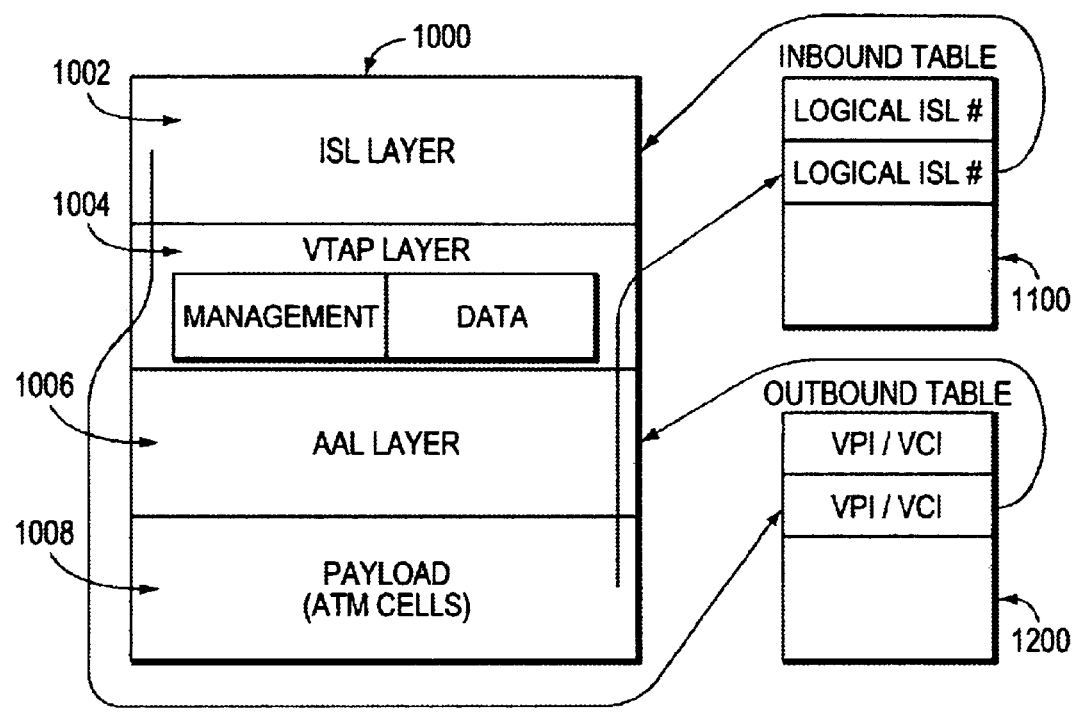
FIG. 10 is a schematic diagram that illustrates an operation of VTAP according to one embodiment of the invention.

FIG. 10 illustrates a software stack layer 1,000, an inbound table 1,100 and an outbound table 1,200 constructed in accordance with an embodiment of the invention. In particular, the figure illustrates the interaction between the AAL layer 1006, the VTAP layer 1004, the ISL layer 1002 and the tables 1100, 1200. In the case where a frame is received by the ATM interface to be transmitted over the ATM network, the frame first passes through the ISL layer 1,002 that assigns the frame with a VLAN ID corresponding to its destination in accordance with the ISL protocol. The VLAN ID distinguishes the frame from other frames that are forwarded to different VLANs. Once the VLAN ID is assigned to the frame, it is passed to the VTAP layer 1,004. At the VTAP layer 1,904, the VTAP header that includes the VLAN ID is generated (an example of a VTAP header configuration has been described above) to encapsulate the frame with it. The VLAN ID is also used to lookup the outbound table 1,200 to determine the VPI/VCI address of the switch to which the frames should be forwarded to. The retrieved VPI/VCI address along with the frame is then passed to the AAL layer 1,006 which segments the frame into ATM cells 1,008, wherein each individual cell has a header with the VPI/VCI address prefixed to it. The cells are then forwarded to the destination switch via the ATM network.

In the case where the ATM cells 1,008 are received at the ATM interface, the cells are passed to the AAL layer 1,006 which re-assembles the cells back into the VTAP encapsulated frame. The frame is then passed to the VTAP layer 1,004. At the VTAP layer 1,004, the VTAP header is stripped and parsed to determine if it is a management frame or a data frame. Management frames will be handled separately further below. If the frame is a data frame, the VTAP header is further parsed for the DEST VLAN field. This field contains the VLAN ID of the packet. The VLAN ID is then used to lookup the inbound table 1,100 to determine the logical ISL address that the frame should be forwarded to. This ISL address along with the frame is forwarded to the ISL layer 1,002, which processes the frame in accordance with the ISL protocol. In the event, the ISL address is located on the same switch, the frame is forwarded to one of the I/O interfaces that forwards the frame to its destination VLAN.

In the event, the logical ISL address indicates that the frame should be forwarded to another switch; this is the case in which the switches in the VTAP network topology require inter-PVC switching. In these instances, the frame is passed from the ISL layer to the VTAP layer in preparation for transmission via the ATM network as described above.

VTAP Management Protocol

The VTAP Management Protocol (VTAMP) is used to initialize the Data Link layer of a PVC, which is being utilized for VTAP. The purpose of the protocol is to learn the identity of the end device and to agree upon versions, frame types, and encapsulation methods. The VTAMP messages are encapsulated in a VTAP header as shown below:

| VTAP Management Protocol Format | |
|---|---|
| IDENTIFIER 0xFF | Common VTAP Header |
| Command (1 octet) | VTAP |
| Data (Up to 2–3 octets) | Mgmt |

Command Definitions

There are only two commands for in the VTAMP protocol: "Initialize" and "Initialize Reply". These commands are used as handshake mechanism to insure both sides of a PVC know the limitation of the node on the other side of the link. The following subsections will define these commands and how they are used.

Initialize Command

A VTAP node sends the "Initialize" command when a PVC is first connected. This command is used to poll until an "Initialize" or "Initialize Reply" command is received. The polling period will be configurable (nominal value=30 seconds). Once a device has received either an "Initialize" or "Initialize Reply" command, it will cease sending "Initialize" commands. The "Initialize" command will be restarted if the Link State of the PVC is transitioned or a "Initialize Reply" is not received within the poll period. It has the following format (note that the number at the top of the field represents the number of octets the field requires):

| VTAMP Initialize Command (in Octets) | | | | |
|---|---|---|---|---|
| 1 | 1 | 6 | 1 | 1 |
| Command = 0x00 | VTAP Version Number | ATM Port MAC Address | Frame Type Support | MTU Size |

Field Definitions:

VTAP Version Number—Specifies the Highest VTAP version that the node supports.

ATM Port MAC Address—The sender's MAC ATM Port Address.

Frame Type Support—Specifies which Frame types this VTAP node supports. The bit mapping for this field is shown below. If the bit is set to '1', then the frame type is supported:

| VTAMP: Initialize Command Frame Type Mapping | |
|---|---|
| Bit of Frame Type field | Frame type |
| 0 | Ethernet |
| 1 | Token Ring |
| 2 | FDDI |
| 3–7 | Not defined |

MTU Size—Specifies the maximum frame size supported by this link. The bit mapping for this field is shown below. If the bit is set to '1', then the frame type is supported:

VTAMP: Initialize Command MTU Size Mapping

| Bit of Frame Type field | Frame type |
|---|---|
| 0 | 1500 |
| 1 | 4K |
| 2 | 8K |
| 3 | 18K |
| 4–7 | Not defined |

Initialize Reply Command

A VTAP node sends the "Initialize Reply" command in response to receiving a "Initialize" command. It has the following format:

VTAMP Initialize Response Command (in Octets)

| 1 | 1 | 6 | 1 | 1 | 1 |
|---|---|---|---|---|---|
| Command = 0x01 | VTAP Version Number | ATM Port MAC Address | Frame Type Support | MTU Size | Reject code |

Field Definitions:

VTAP Version Number—Specifies the Highest VTAP version that the node supports and is less than or equal to the version number of the received "Initialize" command.

ATM Port MAC Address—This node's port MAC ATM Port Address.

Frame Type Support—It is the logical AND of the Frame Type field of the received "Initialize" command and the Frame types supported by this VTAP node. The bit mapping for this field is shown below. If the bit is set to '1', then the frame type is supported.

MTU Size—If the MTU Size field of the received "Initialize" command is equal to or smaller than the maximum MTU size supported by this VTAP port, then the received MTU Size is used for the reply. If the received MM size is larger than what this VTAP port supports, then the MTU Size field is set to the largest supported by this port.

Reject Code—If this node does not agree with any field in either the initiating "Initialize" or "Initialize Reply" command, then it shall set the Reject code field as shown in the following table.

VTAMP: Initialize Reply Command Reject Codes

| Reject Code | Description |
|---|---|
| 0x00 | Accept |
| 0x01 | VTAP Version greater than this node supports |
| 0x02 | VTAP Version less than this node supports (irreconcilable condition) |
| 0x03 | No Common Enca Types (irreconcilable condition) |
| 0x04 | No Common Frame Types (irreconcilable condition) |
| 0x05 | Parameter Changed -one of the received parameters was modified. Note that Reject codes 1 through 4 have a higher priority. |

Bring-up Sequences

This section outlines some common bring up sequences for the VTAMP protocol. The purpose of the bring-up sequence is to insure that each side of a PVC knows the limitations of the node on the other side. The "Initialize" command is used to poll until an "Initialize Reply" command is received.

In the following bring-up sequences, "V=" represents the version number field, "M=" represents the MAC address field, "F=" represents the Frame Type field, "S=" represents the MTU Size field, and "R=" represents the Reject code field.

Nominal Bring-up

Figure 11:
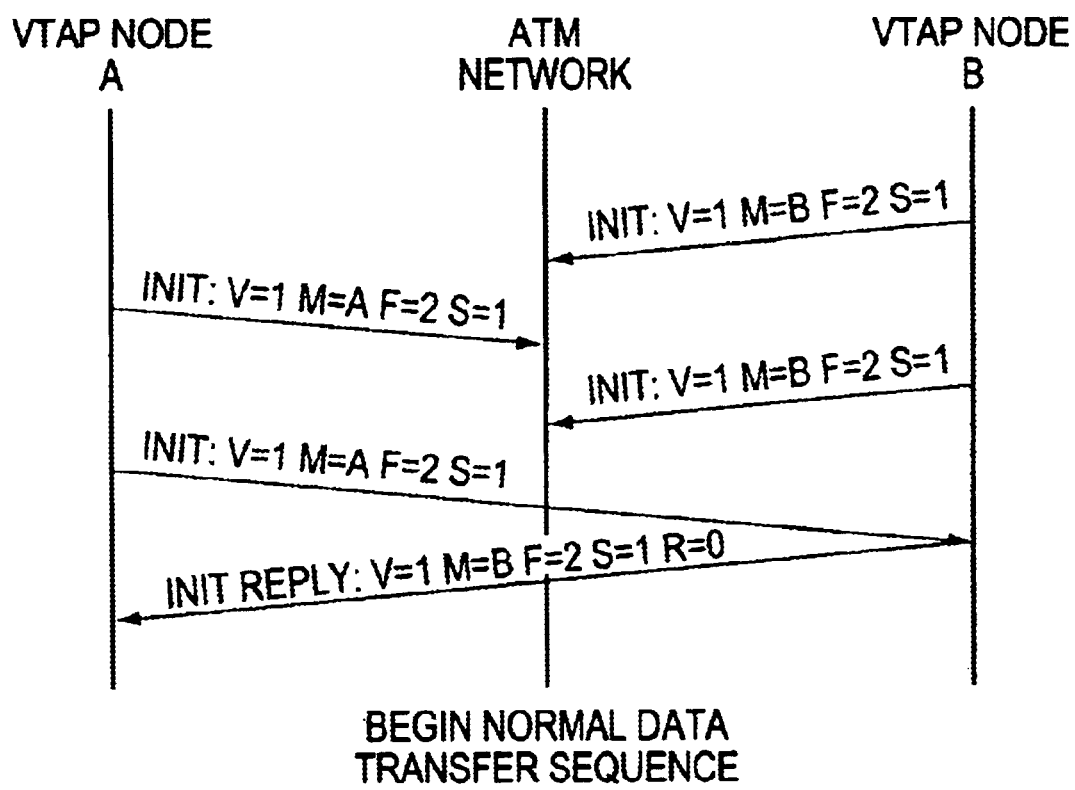
FIG. 11 illustrates a nominal VTAP bring up sequence.

FIG. 11 shows a nominal VTAP bring up sequence. The bring-up sequence represents a nominal case in which only one "Initialize" command is outstanding. Both sides of the link agree on all fields (VTAP Version=1, MTU=4K and the Frame Type is Token Ring, so the first "Initialize Reply" command has a zero reject code and normal data transfer operations may proceed.

Bring-up Collision

Figure 12:
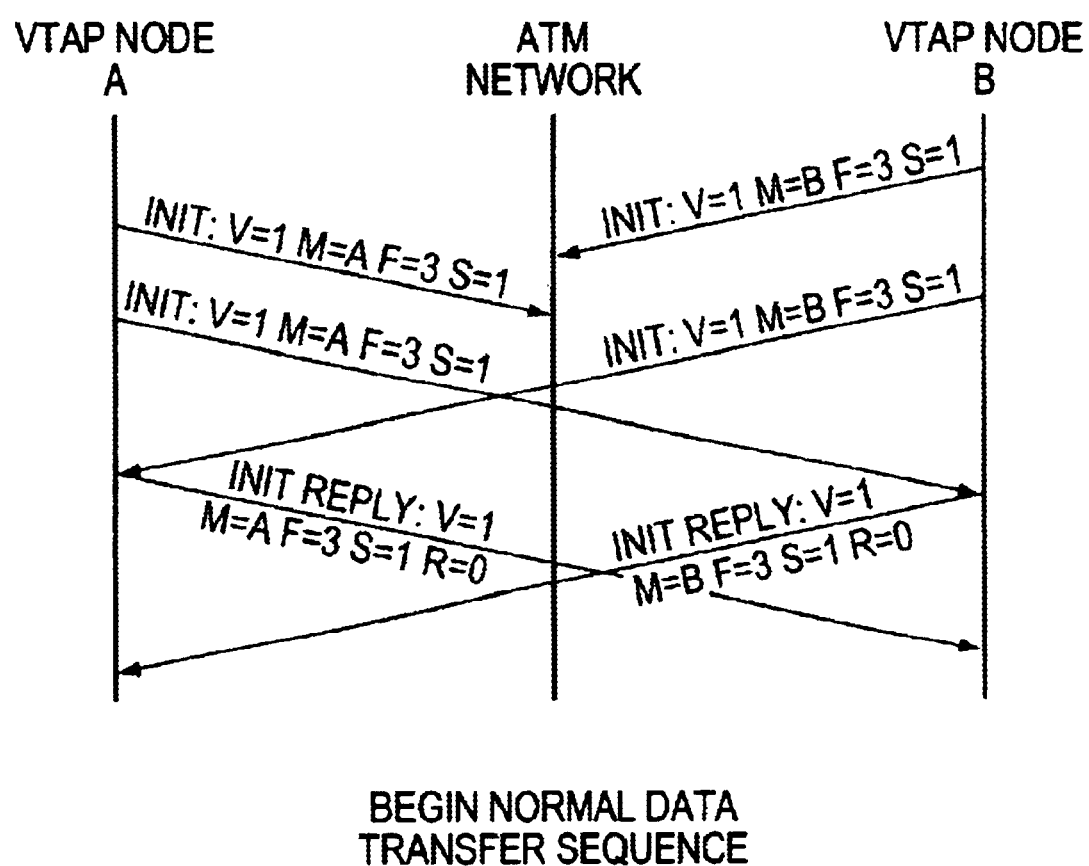
FIG. 12 illustrates a VTAP bring up sequence with collision.

FIG. 12 shows VTAP bring up sequence with collision. This bring-up sequence illustrates the sequence when both nodes receive an "Initialize" command approximately at the same time. Since they agree on all parameters (Note that both nodes Ethernet & Token Ring frame formats), they both send an "Initialize Reply" command with a reject code of zero.

Version Mismatch Bring-up

Figure 13:
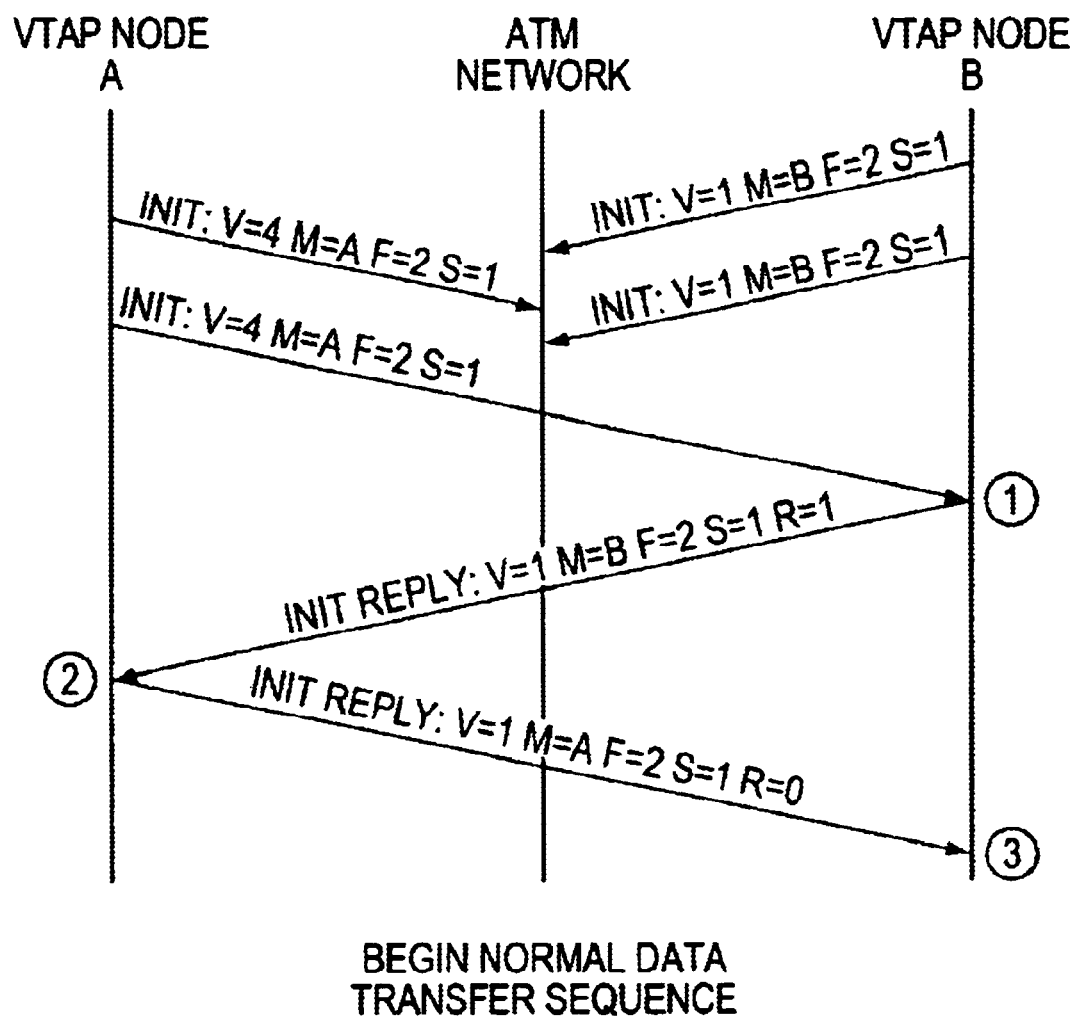
FIG. 13 illustrates a VTAP bring up sequence with version number resolution.

FIG. 13 shows VTAP bring up sequence with version number resolution. This sequence shows how the VTAP version number is resolved between two nodes, which have a different default version number. Node A's VTAP version number is 4 and Node B's is 1. The following list corresponds to the circled numbers in the diagram.

1. When Node B receives the "Initialize" command with the Version number set to 4, it replies with an "Initialize Reply" command with the version number reduce to 1, because that is the highest version it can support. Also, the reject code is set to 1 to indicate that the VTAP Version requested was larger than this node could support.
2. When Node A receives the "Initialize Reply" command, it checks to see if it can support version 1. Since it does support version 1, it sends a "Initialize Reply" with all the fields the same, except for the MAC address and the Reject Code set to zero. Since Node A's is sending a reply with no fields changed and a Reject code of zero, it can enter the normal data transfer phase.
3. When Node B receives the "Initialize Reply", it can enter the normal data transfer phase, because no fields have changed and the Reject Code is zero.

Irreconcilable Bring-up

Figure 14:
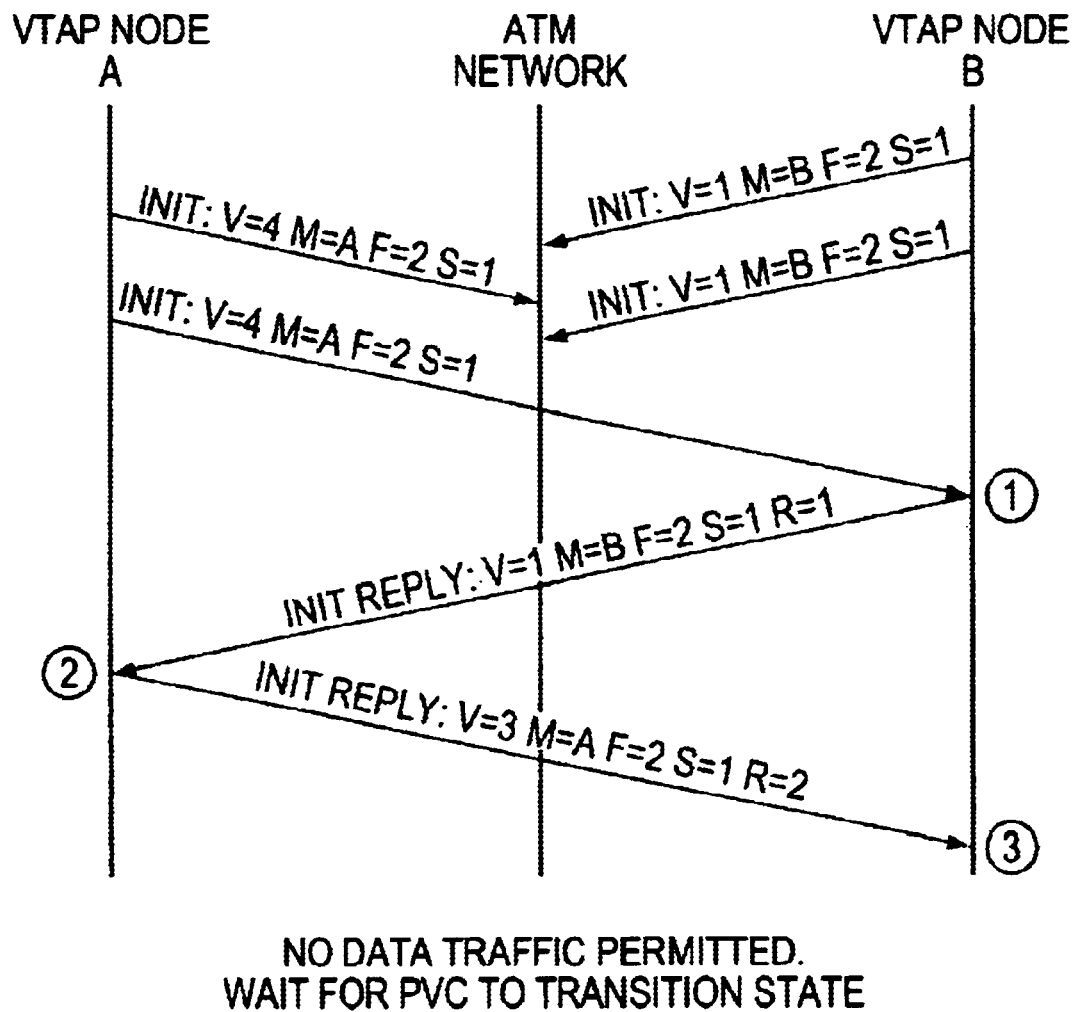
FIG. 14 illustrates a VTAP bring up sequence with version number mismatch.

FIG. 14 shows a VTAP bring up sequence with version number mismatch. In this bring-up sequence, Node A is capable of Versions 3 & 4 and Node B is capable of only version 1, so version number resolution is impossible.

1. When Node B receives the "Initialize" command with the Version number set to 4, it replies with an "Initialize Reply" command with the version number reduce to 1, because that is the highest version it can support. Also, the reject code is set to 1 to indicate that the VTAP Version requested was larger than this node could support.
2. When Node A receives the "Initialize Reply" command, it checks to see if it can support version 1. Since it does not support version 1, it sends a "Initialize Reply" with the Reject code set to 2, which indicates an irreconcilable difference in version numbers. Thus, the node can not enter Data Transfer phase.
3. When Node B receives the "Initialize Reply", it can enter the normal data transfer phase, because no fields have changed and the Reject Code is zero.

MTU Mismatch Bring-up

Figure 15:
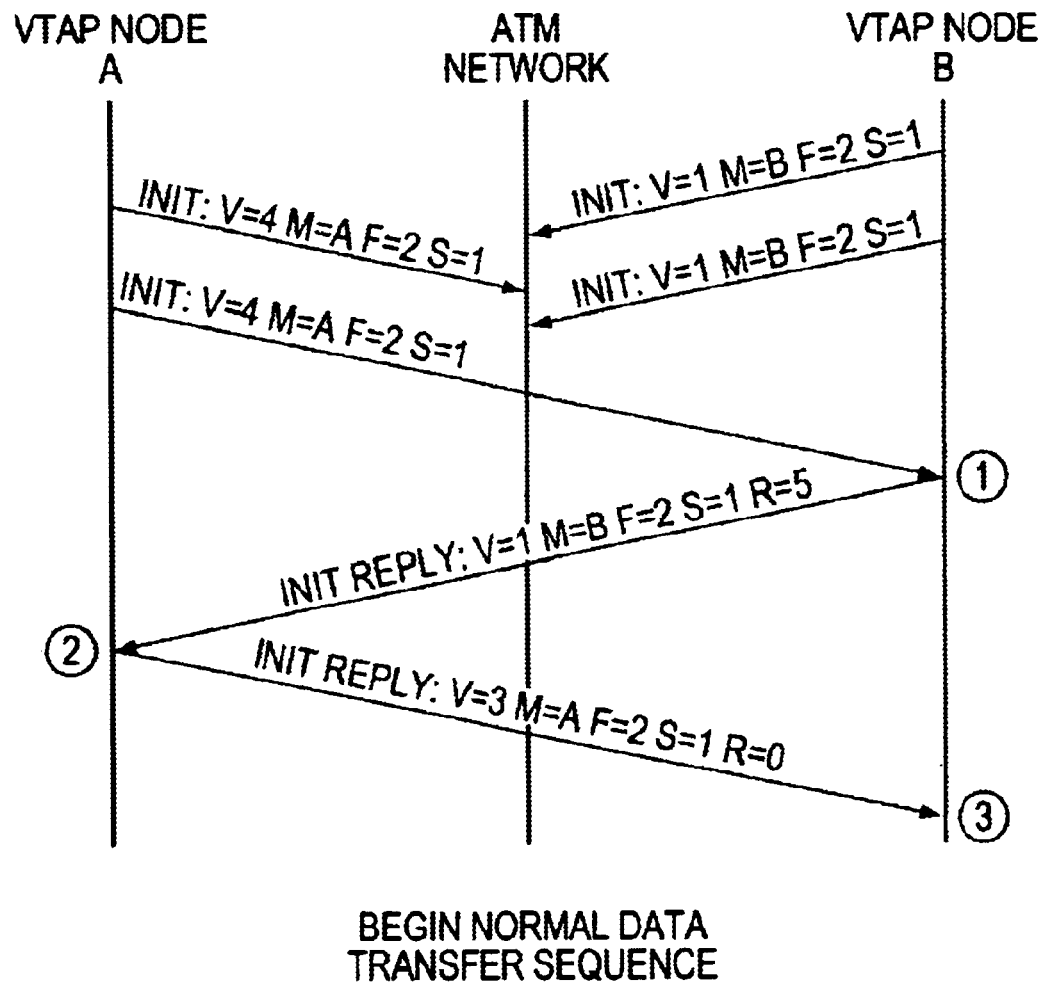
FIG. 15 illustrates a VTAP bring up sequence with MTU size mismatch.

FIG. 15 shows a VTAP bring up sequence with MTU size mismatch. In this bring-up sequence, Node A is capable of MTU size of 18K and Node B is capable of only 4K, so the MTU Size of the link should be resolved to 4K.

1. When Node B receives the "Initialize" command with the MTU Size set to 3 (18K), it replies with an "Initialize Reply" command with the MTU Size reduced to 1 (4K), because that is the largest MTU Size it can support. Also, the reject code is set to 5 to indicate that one of the parameters has been modified (namely the MTU Size field).
2. Node A receives the "Initialize Reply" command with a reject code=5, it checks to which parameter has been modified. It determines that the MTU Size has been reduced to 4K, which is acceptable. So it formats an "Initialize Reply" command with all the parameters unchanged and sets the reject code to 0. It is now ready to enter the Data Transfer Phase.
3. Node B receives the "Initialize Reply" command with a reject code=0.

VTAP that allows for aggregation of multiple VLAN traffic into a single data pipe has been described. It will, however, be apparent that other variations and modifications may be made to the described embodiment with attainment to some or all of their advantages. Therefore, it is the object of the appended claims to cover all such variations and modifications that come within the scope of the invention.

What is claimed is:

1. An apparatus for trunking virtual local area network (VLAN) traffic over an Asynchronous Transfer Mode (ATM) network using Permanent Virtual Circuits (PVCs), the apparatus comprising:
    a first circuit that contains an outbound table configured to produce a virtual path identifier/virtual channel identifier (VPI/VCI) address; in response to VLAN identification number (ID)
    a header circuit that generates a header including the VLAN ID, the header circuit encapsulating a corresponding frame with the header;
    a segmentation circuit that receives the header encapsulated frame and VPI/VCI address and segments the header encapsulated frame into ATM cells prefixed with the VPI/VCI address prior to forwarding the cells over the ATM network.

2. The apparatus as in claim 1, further comprising:
    a re-assembly circuit that receives the ATM cells and re-assembles the ATM cells into the frame encapsulated with the header;
    a parsing circuit that parses the header for the VLAN ID;
    a second circuit that contains an inbound table that receives the VLAN ID and outputs a corresponding apparatus ID; and
    an apparatus identification circuit that receives the apparatus ID to determine if the frame should be forwarded within the apparatus.

3. The apparatus as in claim 1, wherein the VLAN ID is generated by an Inter-Switch Link (ISL) protocol.

4. The apparatus as in claim 2, wherein the header circuit is adapted to generate a management header that encapsulates the frame, wherein the management header encapsulated frame is used to obtain information of a port of a destination apparatus.

5. The apparatus as in claim 4, wherein a portion of the information obtained from the management header encapsulated frame is used to construct the inbound table that is stored in the first circuit.

6. The apparatus as in claim 1, wherein the outbound table is constructed by using the ISL protocol.

7. An apparatus for trunking virtual local area network (VLAN) traffic over an Asynchronous Transfer Mode (ATM) network using Permanent Virtual Circuits (PVCs), the apparatus comprising:
    a memory that contains an outbound table that receives an VLAN identification number (ID) and outputs a corresponding virtual path identifier/virtual channel identifier (VPI/VCI) address;
    means for generating a header that includes the VLAN ID, the header generating means further encapsulating a corresponding frame with the header;
    a segmentation circuit that receives the header encapsulated frame and VPI/VCI address and segments the header encapsulated frame into ATM cells prefixed with the VPI/VCI address.

8. The apparatus as in claim 7, further comprising:
    a re-assembly circuit that receives the ATM cells and re-assembles the ATM cells into the frame encapsulated with the header;
    means for parsing that parses the header for the VLAN ID;
    a second circuit that contains an inbound table that receives the VLAN ID and outputs a corresponding apparatus ID; and
    means for receiving the apparatus ID to determine if the frame should be forwarded within the apparatus.

9. A method of trunking virtual local area network (VLAN) traffic over an Asynchronous Transfer Mode (ATM) network using Permanent Virtual Circuits (PVCs), the method comprising:
    accessing an outbound table that receives an VLAN identification number (ID) and outputs a corresponding virtual path identifier/virtual channel identifier (VPI/VCI) address;
    generating a header that includes the VLAN ID;
    encapsulating a corresponding frame with the header;
    segmenting the header encapsulated frame into ATM cells and prefixing the ATM cells with the VPI/VCI address.

10. The method as in claim 9, further comprising:
    receiving the ATM cells;
    re-assembling the ATM cells into the frame encapsulated with the header;
    parsing the header for the VLAN ID;
    accessing an inbound table that receives the VLAN ID and outputs a corresponding apparatus ID; and
    using the apparatus ID to determine if the frame should be forwarded within the apparatus.

11. The method as in claim 9, wherein the VLAN ID is generated by an Inter-Switch Link (ISL) protocol.

12. The method as in claim 10, further comprising:
    generating a management header that encapsulates the frame, and
    using the management header encapsulated frame to obtain information of a port of a destination apparatus.

13. The method as in claim 12, further comprising:
    using a portion of the information obtained from the management header encapsulated frame to construct the inbound table.

14. The method as in claim 9, wherein the outbound table is constructed using the ISL protocol.

15. A processor readable medium which when executed by a processor causes the processor to perform a method of trunking virtual local area network (VLAN) traffic over an Asynchronous Transfer Mode (ATM) network using Permanent Virtual Circuits (PVCs), the method comprising:

accessing an outbound table that receives an VLAN identification number (ID) and outputs a corresponding virtual path identifier/virtual channel identifier (VPI/VCI) address;

generating a header that includes the VLAN ID;

encapsulating a corresponding frame with the header;

segmenting the header encapsulated frame into ATM cells and prefixing the ATM cells with the VPI/VCI address.

16. The processor readable medium as in claim 15, further comprising:

receiving the ATM cells;

re-assembling the ATM cells into the frame encapsulated with the header;

parsing the header for the VLAN ID;

accessing an inbound table that receives the VLAN ID and outputs a corresponding apparatus ID; and using the apparatus ID to determine if the frame should be forwarded within the apparatus.

17. The processor readable medium as in claim 15, wherein the VLAN ID is generated by an Inter-Switch Link (ISL) protocol.

18. The processor readable medium as in claim 16, further comprising:

generating a management header that encapsulates the frame, and using the management header encapsulated frame to obtain information of a port of a destination apparatus.

19. The processor readable medium as in claim 18, further comprising:

using a portion of the information obtained from the management header encapsulated frame to construct the inbound table.

20. The processor readable medium as in claim 15, wherein the outbound table is constructed using the ISL protocol.

* * * * *